United States Patent
Nobel

(10) Patent No.: US 12,221,978 B2
(45) Date of Patent: Feb. 11, 2025

(54) HOUSING FOR FLOW-CONDUCTING COMPONENTS

(71) Applicant: KSB SE & Co. KGaA, Frankenthal (DE)

(72) Inventor: Tammuz Nobel, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 18/017,815

(22) PCT Filed: Jul. 26, 2021

(86) PCT No.: PCT/EP2021/070857
§ 371 (c)(1),
(2) Date: Jan. 24, 2023

(87) PCT Pub. No.: WO2022/023266
PCT Pub. Date: Feb. 3, 2022

(65) Prior Publication Data
US 2023/0265861 A1     Aug. 24, 2023

(30) Foreign Application Priority Data
Jul. 28, 2020    (DE) .................... 10 2020 119 914.7

(51) Int. Cl.
*F04D 29/42*     (2006.01)
*B33Y 10/00*     (2015.01)
(Continued)

(52) U.S. Cl.
CPC .............. *F04D 29/42* (2013.01); *B33Y 80/00* (2014.12); *B33Y 10/00* (2014.12); *F04D 29/40* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,207,560 A | 5/1993 | Urban | |
| 8,721,262 B1 * | 5/2014 | Kuropatov | ................ F04D 7/08 415/184 |

(Continued)

FOREIGN PATENT DOCUMENTS

| | | |
|---|---|---|
| DE | 10 2014 004 121 A1 | 9/2015 |
| DE | 10 2015 202 417 A1 | 8/2016 |

(Continued)

OTHER PUBLICATIONS

International Search Report (PCT/ISA/210) issued in PCT Application No. PCT/EP2021/070857 dated Oct. 13, 2021 with English translation (five (5) pages).

(Continued)

*Primary Examiner* — Binh Q Tran
(74) *Attorney, Agent, or Firm* — Crowell & Moring LLP

(57) ABSTRACT

A method for forming a housing for a flow-conducting component includes forming at least two functional regions of the housing having different material properties using at least one of radiation-induced melting and solidification of a build material and a process gas jet. Each functional region of the housing may be generated from a different construction material, and at least one functional layer may be formed with a reduced weight structure such as a honeycomb structure.

3 Claims, 3 Drawing Sheets

(51) Int. Cl.
  *B33Y 80/00* (2015.01)
  *F04D 29/40* (2006.01)
  *F16K 27/02* (2006.01)

(52) U.S. Cl.
  CPC ........ *F04D 29/424* (2013.01); *F04D 29/4246* (2013.01); *F05D 2210/13* (2013.01); *F05D 2230/13* (2013.01); *F05D 2230/22* (2013.01); *F05D 2230/31* (2013.01); *F05D 2230/40* (2013.01); *F05D 2250/52* (2013.01); *F05D 2300/701* (2013.01); *F16K 27/02* (2013.01)

(56) References Cited

U.S. PATENT DOCUMENTS

| | | | | |
|---|---|---|---|---|
| 11,187,149 | B2* | 11/2021 | Kobielski | B33Y 80/00 |
| 2013/0004680 | A1* | 1/2013 | Godfrey | B23K 35/0244 |
| | | | | 219/76.12 |
| 2013/0121817 | A1 | 5/2013 | Boehm et al. | |
| 2015/0034604 | A1 | 2/2015 | Subramanian et al. | |
| 2017/0030343 | A1* | 2/2017 | Okasaka | F04B 27/1054 |
| 2017/0102001 | A1 | 4/2017 | Schibli et al. | |
| 2018/0236595 | A1 | 8/2018 | Boehm et al. | |
| 2020/0240432 | A1* | 7/2020 | Lee | B29C 70/68 |
| 2021/0025325 | A1* | 1/2021 | Kobielski | F04D 29/624 |
| 2021/0340881 | A1* | 11/2021 | Bourolleau | B29C 70/24 |

FOREIGN PATENT DOCUMENTS

| | | |
|---|---|---|
| DE | 10 2017 204 588 A1 | 9/2018 |
| EP | 2 236 839 A1 | 10/2010 |

OTHER PUBLICATIONS

German-language Written Opinion (PCT/ISA/237) issued in PCT Application No. PCT/EP2021/070857 dated Oct. 13, 2021 (five (5) pages).

German-language Search Report issued in German Application No. 10 2020 119 914.7 dated Jul. 15, 2021 with partial English translation (15 pages).

* cited by examiner

HOUSING FOR FLOW-CONDUCTING COMPONENTS

CROSS REFERENCE TO RELATED APPLICATION

This application claims priority under 35 U.S.C. § 119 from German Patent Application No. 102020119914.7, filed Jul. 28, 2020, the entire disclosure of which is herein expressly incorporated by reference.

BACKGROUND AND SUMMARY OF THE INVENTION

The invention relates to a housing for a flow-conducting component, having at least two functional regions.

Housings serve for liquid-tight and pressure-resistant sealing of an interior from the outside. For example, in the case of centrifugal pumps, they surround the pump impeller, which supplies energy to the delivery medium by means of wheels on the rotating shaft. The supply and removal of the conveying stream is performed by the entry and exit ports, which are often also referred to as feed or suction and pressure ports. They are connected by pipe connections to pipelines.

The pump housings are predominantly cast, but may also be forged, welded, pressed or drawn. Machine safety depends to a significant degree on the service life of the pump housing, and so many industry-specific rules frameworks stipulate the housing materials and, to some degree, also the sizing of the wall thicknesses. Metallic cast materials that are frequently used here are cast iron, spheroidal cast iron and cast steel, ferritic or austenitic chromium steels, austenitic cast iron, but also duplex steels for high-corrosion-resistance applications, for example in seawater desalination.

Quite different demands are made on the functional regions of the housings of flow-conducting components. For instance, a functional region having load-bearing properties is to have a high strength and low brittleness. By contrast, a functional region having contact with the flow medium is subject to comparatively abrasive stress and should be made from a hard, wear-resistant material.

In order to meet these demands, the functional regions of the housings must often be worked comprehensively and intensively in many additional steps, such that coatings, reinforcements and the like achieve the required properties at all.

It is an object of the invention to create a housing, even a large housing, for flow-conducting components having different functional regions in a manufacturing method. It should be possible to configure this housing individually with regard to material combinations, properties and material thickness. This housing should consist of a minimum number of individual parts and at the same time be as light as possible. The exchange of replacement parts should be favored by the construction of the housing. It should be possible to implement the housing in a simple and inexpensive manner.

This object is achieved in accordance with the invention by a housing for a flow-conducting component. Preferred variants can be inferred from the dependent claims, the description and the drawings.

According to the invention, a housing for flow-conducting components has multiple functional regions. Such functional regions fulfill different functions. For instance, a functional region having contact with the flowing medium is particularly wear-resistant in order to be able to withstand the abrasive forces from the flowing medium. A functional region having load-bearing properties is made with a high-strength material in an optimized support structure. A functional region having sealing properties protects the housing with the inner functional regions and the internal components from outside influences and creates a characteristic recognition effect. In this case, the functional region having load-bearing properties is advantageously disposed between the inner functional region having contact with the flowing medium and the outer functional region having sealing properties. According to the invention, each functional region is generated from a different build material in order to achieve the ideal properties of the functional regions. Advantageously, the housing with all the required functional regions is formed in a single additive manufacturing method.

A housing is a fixed shell that surrounds and protects sensitive contents and/or protects the environment from hazardous contents. In industry, there are housings for components, assemblies and items of equipment. Housings for flow-conducting components may, by way of example, be housings for pumps, especially centrifugal pumps, and housings for valves.

The housing of the invention having the at least two functional regions is formed from different build material. The build material preferably comprises metallic powder particles, especially low-alloyed and/or high-alloyed steel powder particles, and/or fusible polymer and/or a metal-polymer hybrid material.

The build material for production of the housing, especially of the functional region having contact with the flowing medium, preferably comprises metallic powder particles. In one variant of the invention, for this purpose, iron-containing and/or cobalt-containing powder particles are used. These may contain additions, for example chromium, molybdenum or nickel.

According to the invention, the housing for flow-conducting components having multiple functional regions is formed from different build materials in an additive manufacturing method. The 3D shape of the housing is recorded in software as a dataset. At the places where the housing is to be formed, a robot arm is active, which has tools for different additive methods and forms the different functional regions layer by layer. Advantageously, for each layer, it is possible to perform the suitable build process for each build material successively or simultaneously for each layer, so as to give rise to a complex housing made of different materials, the functional regions of which are optimized to the demands of the later use.

In one variant of the invention, the functional region having load-bearing properties is produced with the molten layer tool of the additive manufacturing method, wherein molten polymer is used to apply a pattern of dots to an area. Extruding by means of a nozzle and subsequent solidification by cooling at the desired position gives a load-bearing construction, especially in the form of a grid and/or in the form of honeycombs. By creating the functional regions in a cavity-forming manner with a particularly load-bearing structure, the functional regions have enormous strength with simultaneously very low weight. The housing is typically constructed by repeatedly traversing a working plane line by line and then moving the working plane upward by stacking, such that the functional regions of the housing are formed layer by layer.

In a further variant of the invention, the functional region having contact with the flowing medium and/or the functional region having sealing properties is formed by the cold gas spraying tool of the additive manufacturing method. In this case, the coating material is applied in powder form with very high speed to the functional region having load-bearing properties. For this purpose, a process gas heated to a few hundred degrees, for example nitrogen or helium, is accelerated to supersonic speed by expansion in a Laval nozzle and then the powder particles are injected into the gas jet. The injected particles are accelerated here to such a high speed that they form a dense and firmly adhering layer when they hit parts of the housing.

For this purpose, metallic powder particles, especially low-alloyed and/or high-alloyed steel powder particles and/or cobalt-containing powder particles with additions such as chromium, molybdenum or nickel, for example, are used. Depending on the requirement on the functional regions, it is possible to vary the type of powder particles and/or the layer thickness applied. Advantageously, it is possible in an additive manufacturing method to produce a housing that has been configured with regard to individual demands. For this purpose, an adjusted dataset of the 3D shape is recorded in each case in the software of the additive manufacturing method.

In a particularly advantageous variant of the invention, the functional region having contact with the flowing medium and/or the functional region having sealing properties is produced from a build material by successive melting and solidification of layers by means of radiation. The different properties of the individual functional regions of the housing are generated here by variations in the radiation. By controlling the local introduction of heat, even in the build of the housing, especially of the functional regions, modification of the material properties is undertaken. It is thus possible, in a functional region of the housing, to produce zones and microstructures of different material states of a chemically homogeneous material and hence different properties.

For creation of the housing having at least two functional regions, there is controlled energy input in the build for alteration of the mechanical properties in the microvolume of the material. A subsequent heat treatment is dispensed with, such that the local occurrence of different material states is maintained. There is likewise no longer any need for costly and inconvenient coatings.

The metallic build material is applied to a plate in powder form in a thin layer. The pulverulent material is locally completely remelted by means of radiation at the respectively desired sites and, after solidification, forms a solid material layer. Subsequently, this baseplate is lowered by the magnitude of a layer thickness, and powder is applied again. This cycle is repeated until all layers have been remelted. The finished housing is freed of the excess powder.

The radiation used may, for example, be a laser beam that generates the flow-guiding component from the individual powder layers. The data for guiding the laser beam are created on the basis of a 3D-CAD element by means of software. As an alternative to selective laser melting, it is also possible to use an electron beam (EBM).

In a further variant of the invention, the energy input introduced by the radiation may be different in the functional regions that come into contact with the medium, for example the surfaces of the functional regions that have predominantly load-bearing properties. This may be achieved, for example, by varying the intensity of the radiation. The scan rate with which the laser beam moves over the individual powder layers also influences the energy input and hence the resultant microstructure. The functional region having load-bearing properties preferably has a greater strength than the functional region that comes into contact with the medium. By contrast, the hardness of the functional region that comes into contact with the medium is greater compared to the hardness of the functional region having load-bearing properties.

The toughness and/or elongation at break of the different functional regions can also be controlled via the energy input via the radiation, in order to create different properties of the flow-conducting component.

It is particularly highly advantageous to manufacture large housings as well for flow-conducting components in an additive manufacturing method. Through the use of a particularly mobile robot arm that has different tools for additive manufacture, it is possible to manufacture particularly complex and also large housings, the functional regions of which are formed from different build material.

According to the invention, the layers of the functional regions are formed from different build material collectively in an additive method, and the layers are created directly.

Preferably, the direct and collective creation of the functional regions in an additive manufacturing method generates cohesive formation and/or form-fitting combination of the functional regions of the housing for flow-conducting components.

Further features and advantages of the invention will be apparent from the description of working examples with reference to the drawings and from the drawings themselves.

DETAILED DESCRIPTION

Figure 1:
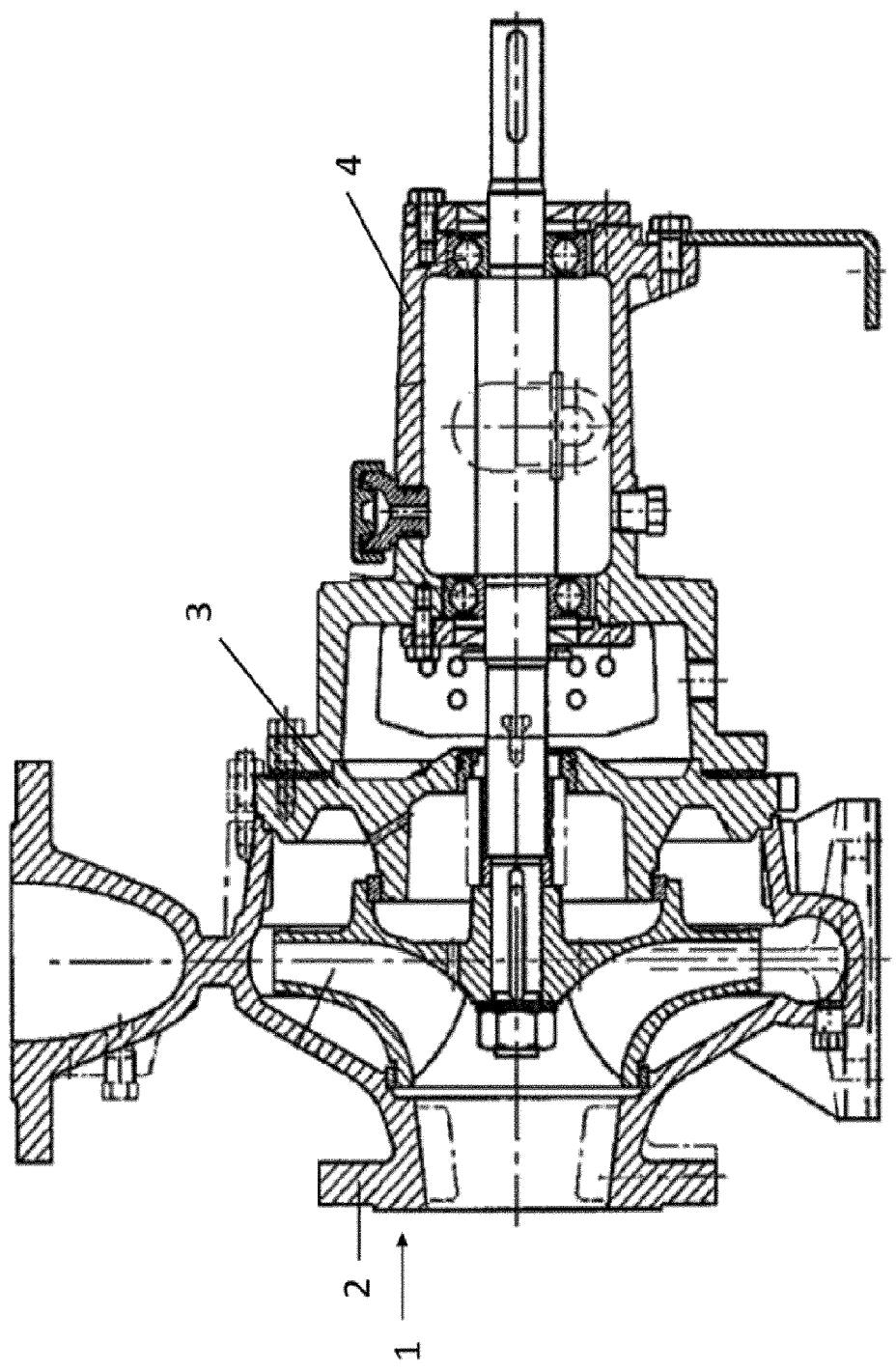
FIG. 1 a section diagram of a centrifugal pump arrangement in accordance with an embodiment of the present invention.

FIG. 1 shows a section diagram through a centrifugal pump with a housing 1 for flow-conducting components. The housing 1 consists of three housing parts 2, 3 and 4. The spiral housing 2 has a suction port and a pressure port and surrounds the pump impeller. The bearing carrier caps 3 and 4 serve to accommodate the bearings and to seal the fluid space.

The impeller is designed as a radial impeller and is driven by a shaft. The shaft is set in rotation by a motor which is not shown in this diagram. The shaft is supported by means of bearings.

Figure 2:
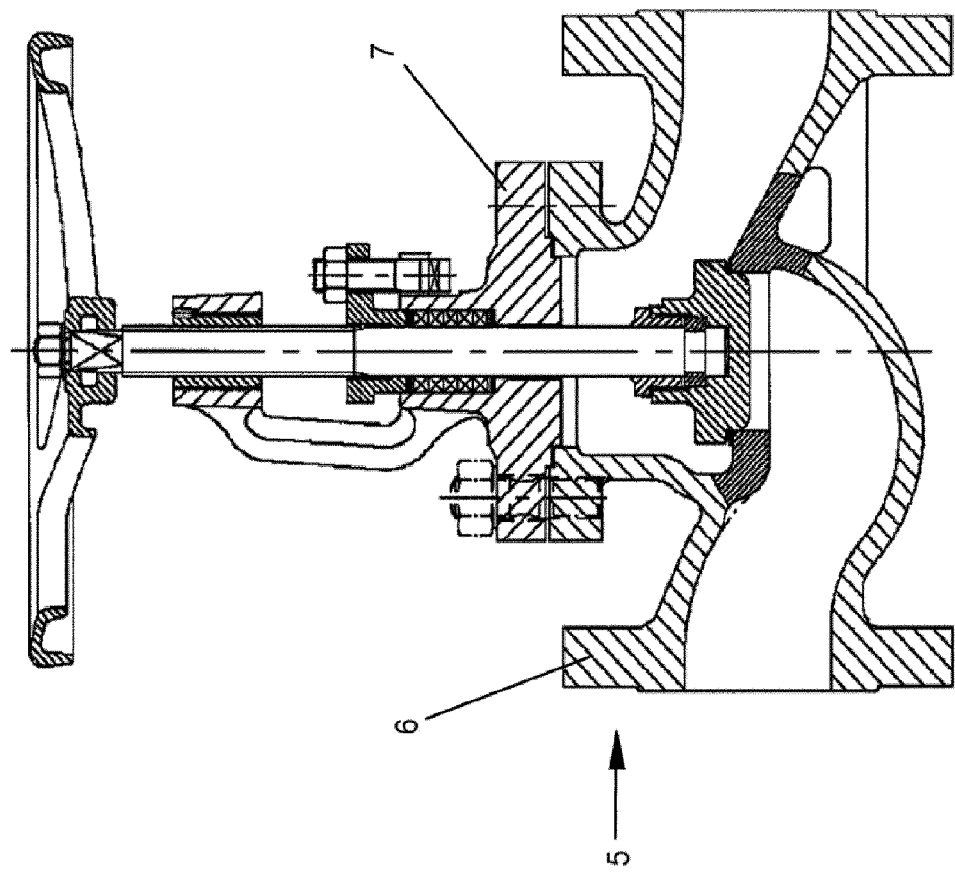
FIG. 2 a section diagram of a valve in accordance with an embodiment of the present invention.

FIG. 2 shows a section diagram of a housing 5 for flow-conducting components in the example execution of a valve. The valve has a housing 6 with a valve lid 7. Disposed within the housing 6 is a barrier body that can be moved in vertical direction via a spindle by means of a drive.

Figure 3:
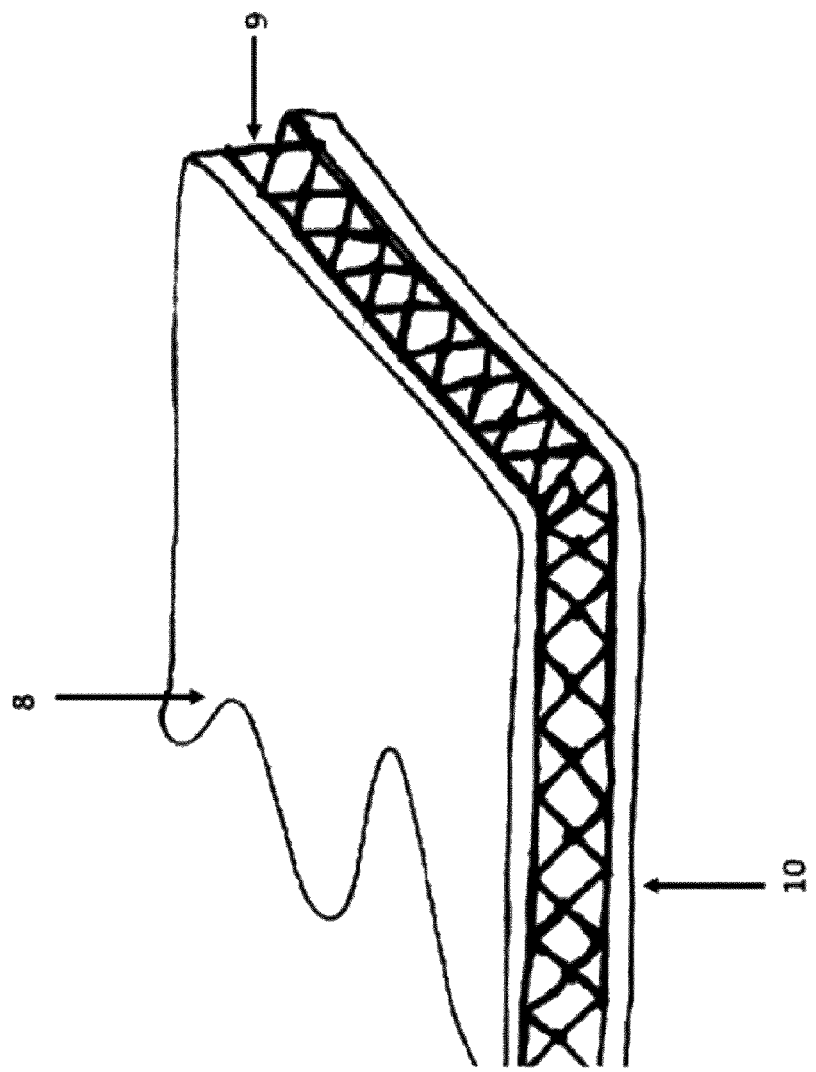
FIG. 3 a schematic diagram of the functional regions with different build material in accordance with an embodiment of the present invention.

FIG. 3 shows a schematic diagram of the functional regions 8, 9 and 10 of a housing for flow-conducting components.

In the variant of the invention shown, the functional region 8 having contact with the flowing medium is preferably formed by a cold gas spraying tool of the additive manufacturing method. For this purpose, the coating material is applied in powder form with very high speed to the functional region 9 having load-bearing properties. For this purpose, a process gas that has been heated to a few hundred degrees, for example nitrogen or helium, is accelerated to supersonic speed by expansion in a Laval nozzle and then the powder particles are injected into the gas jet. The particles injected are accelerated here to such a high speed that they form a dense and firmly adhering layer when they hit parts of the housing.

The functional region 9 having load-bearing properties is created, by way of example, with a melt layer tool of the additive manufacturing method, wherein fusible polymer is used to apply a pattern of dots to an area. By melting and extruding by means of a nozzle and subsequent curing by cooling at the desired position, a load-bearing structure is created, especially in the form of a grid. By creating the functional region 9 in a cavity-forming manner with a particularly load-bearing structure, the functional region 9 has enormous strength with simultaneously very low weight.

The functional region 10 having sealing properties is produced from a pulverulent build material by successive melting and solidification of layers by means of radiation. The metallic powder, especially low-alloyed and/or high-alloyed steel powder particles and/or cobalt-containing powder particles with additions such as chromium, molybdenum or nickel, for example, is applied to a plate in a thin layer. The pulverulent material is locally completely remelted at the respectively desired sites by means of radiation and forms a solid material layer after solidification.

The layers of functional regions 8, 9 and 10 that are made of different build material are formed collectively in an additive method, and the layers are created directly. This generates cohesive formation and/or form-fitting combination of the functional regions 8, 9 and 10 of the housing for flow-conducting component.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of producing a housing for a flow-conducting component having at least two functional regions in an integrative manufacturing unit, comprising the steps of:
    forming at least one functional region of the at least two functional regions in grid or honeycomb structure from a first build material;
    applying a layer of a second build material to the at least one other functional region of the at least two functional regions; and
    selectively applying energy in the form of radiation, heat and pressure to the at least two functional regions, wherein the selectively-applied energy is controlled to generate at least one predetermined property in the at least one functional region of the at least two functional regions which is different from at least one predetermined property in the at least one other functional region of the at least two functional regions, wherein the at least two functional regions are formed layer by layer by a same robot arm during a single generative manufacturing process.

2. The method of producing a housing for a flow-conducting component having at least two functional regions as claimed in claim 1, further comprising the step of:
    applying the build material using a process gas jet to generate at least one functional region of the at least two function regions having a predetermined layer thickness.

3. The method of producing a housing for a flow-conducting component having at least two functional regions as claimed in claim 1, wherein each functional region of the at least two functional regions is generated from a different build material.

* * * * *